(12) United States Patent
Ellis et al.

(10) Patent No.: US 9,796,163 B2
(45) Date of Patent: Oct. 24, 2017

(54) METHOD FOR MAKING IMPROVED COMPOSITE MATERIALS

(71) Applicant: Hexcel Composites Limited, Dublin, CA (US)

(72) Inventors: John Ellis, Duxford (GB); Emilie Fisset, London (GB)

(73) Assignee: Hexcel Composites Limited, Duxford (GB)

( * ) Notice: Subject to any disclaimer, the term of this patent is extended or adjusted under 35 U.S.C. 154(b) by 320 days.

(21) Appl. No.: 14/603,394

(22) Filed: Jan. 23, 2015

(65) Prior Publication Data

US 2015/0129128 A1 May 14, 2015

Related U.S. Application Data

(62) Division of application No. 13/811,054, filed as application No. PCT/EP2011/063889 on Aug. 11, 2011, now abandoned.

(30) Foreign Application Priority Data

Aug. 12, 2010 (GB) .................................. 1013524.2

(51) Int. Cl.
*B32B 37/12* (2006.01)
*B26D 1/24* (2006.01)
(Continued)

(52) U.S. Cl.
CPC .............. *B32B 37/12* (2013.01); *B26D 1/245* (2013.01); *B29C 70/086* (2013.01); *B32B 3/08* (2013.01);
(Continued)

(58) Field of Classification Search
CPC .................. B29C 33/68; B29C 70/386; B29C 2793/0063; B29C 2793/0036; B65H 2301/4148; B65H 2301/414864
(Continued)

(56) References Cited

U.S. PATENT DOCUMENTS 4,775,583 A 10/1988 Kawamura
4,871,611 A * 10/1989 LeBel ...................... A61F 13/60
427/394

(Continued)

FOREIGN PATENT DOCUMENTS

EP 2067892 6/2009
GB WO 2009104040 A2 * 8/2009 ............. B29C 33/68
(Continued)

OTHER PUBLICATIONS

Department of Defense Handbook, Composite Materials Handbook, vol. 3. Polymer Matrix Composites Materials Usage, Design, and Analysis, pp. 2-44-2-46, Jun. 17, 2002.
(Continued)

*Primary Examiner* — Scott W Dodds
(74) *Attorney, Agent, or Firm* — W. Mark Bielawski; David J. Oldenkamp

(57) ABSTRACT

A strip of curable prepreg comprising unidirectional fibers aligned with the length of the strip, the fibers being at least partially impregnated with curable thermosetting resin and comprising a flexible polymeric sheet on an outer face of the strip, wherein the strip has a substantially rectangular cross-section defining a width and a thickness of the strip.

8 Claims, 3 Drawing Sheets

(51) Int. Cl.
| | |
|---|---|
| B29C 70/08 | (2006.01) |
| B32B 3/08 | (2006.01) |
| B32B 5/00 | (2006.01) |
| B32B 37/16 | (2006.01) |
| B32B 5/02 | (2006.01) |
| B32B 5/08 | (2006.01) |
| B32B 7/06 | (2006.01) |
| B32B 27/12 | (2006.01) |
| B32B 27/32 | (2006.01) |
| B32B 27/36 | (2006.01) |
| B32B 3/26 | (2006.01) |
| B29C 70/38 | (2006.01) |
| B29K 23/00 | (2006.01) |
| B29K 67/00 | (2006.01) |
| B29K 105/24 | (2006.01) |

(52) U.S. Cl.
CPC ............... *B32B 3/266* (2013.01); *B32B 5/00* (2013.01); *B32B 5/022* (2013.01); *B32B 5/08* (2013.01); *B32B 7/06* (2013.01); *B32B 27/12* (2013.01); *B32B 27/32* (2013.01); *B32B 27/36* (2013.01); *B32B 37/16* (2013.01); *B29C 70/386* (2013.01); *B29C 2793/0036* (2013.01); *B29C 2793/0081* (2013.01); *B29K 2023/06* (2013.01); *B29K 2023/12* (2013.01); *B29K 2067/00* (2013.01); *B29K 2105/243* (2013.01); *B29K 2995/0094* (2013.01); *B32B 2037/1253* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2262/14* (2013.01); *B32B 2270/00* (2013.01); *B32B 2307/546* (2013.01); *B32B 2307/58* (2013.01); *B32B 2307/748* (2013.01); *B32B 2605/18* (2013.01); *B65H 2301/4148* (2013.01); *Y10T 156/10* (2015.01); *Y10T 156/1052* (2015.01); *Y10T 428/24* (2015.01)

(58) Field of Classification Search
USPC ................ 156/178, 179, 271, 523, 574, 577
See application file for complete search history.

(56) References Cited

U.S. PATENT DOCUMENTS

| | | | | |
|---|---|---|---|---|
| 4,882,007 | A * | 11/1989 | Lengen | B29C 70/388 156/523 |
| 5,043,032 | A * | 8/1991 | Hunter | G01B 7/10 156/378 |
| 9,278,509 | B2 * | 3/2016 | Hou | B32B 37/20 |
| 2006/0272768 | A1 * | 12/2006 | Kitamura | B29C 47/0021 156/244.11 |
| 2007/0044900 | A1 | 3/2007 | Tingley | |
| 2008/0135174 | A1 | 6/2008 | Kisch | |
| 2010/0086765 | A1 | 4/2010 | Inston | |
| 2010/0282404 | A1 * | 11/2010 | Ellis | B29C 33/68 156/234 |
| 2011/0114252 | A1 * | 5/2011 | Partington | B29C 70/44 156/157 |
| 2012/0015135 | A1 | 1/2012 | Beraud et al. | |

FOREIGN PATENT DOCUMENTS

| | | |
|---|---|---|
| JP | 61129629 | 6/1986 |
| JP | 2004043653 | 2/2004 |
| WO | 2009/104040 | 8/2009 |
| WO | 2009/112694 | 9/2009 |
| WO | 2009/115734 | 9/2009 |
| WO | 2010/061114 | 6/2010 |

OTHER PUBLICATIONS

Machine English Translation of JP2004-043653.

* cited by examiner

METHOD FOR MAKING IMPROVED COMPOSITE MATERIALS

This application is a divisional of co-pending U.S. patent application Ser. No. 13/811,054, filed on Jan. 18, 2013, which is a 371 of PCT/EP2011/063889, which was filed on Aug. 11, 2011.

TECHNICAL FIELD

The present invention relates to strips of prepreg, particularly for application by an automated lay-up apparatus.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

In a typical lay-up procedure, the prepreg is provided as a roll of material to provide length (e.g. of the order of several meters) of prepreg of a predefined width (e.g. of the order of several centimeters) and thickness (e.g. of the order tenths of millimeters up to several millimeters). Typically cure ply thicknesses of prepregs for aerospace applications range from 0.125 mm to 0.25 mm and their fibre average weights range from 100 to 300 g/m².

To facilitate such unrolling, the prepreg typically has an outer layer of backing paper which prevents the adjacent layers of prepreg from sticking together. Such backing paper is discarded before lay-up.

A common method on laying up such prepreg is by means of an automated lay-up apparatus. This is a much more efficient method of laying up prepreg as compared to conventional hand lay-up. However, it does impose additional constraints on the dimensions of the prepreg, if it is to automatically lay down the prepreg at an acceptable quality standard.

When laying prepreg to form a structure which has relatively high curvature, it is known to lay down strips of prepreg which have a much smaller width than conventional prepreg. This reduces any wrinkling that a wider strip of prepreg may suffer from during lay-up.

It is known in the art to produce so-called slit tape prepreg, which is produced by passing a sheet of prepreg through a slitting or cutting unit to produce a plurality of parallel strips of prepreg. The width of the strips produced are very tightly controlled and can be specified to within a fraction of a millimeter.

Sheets of prepreg are typically manufactured with outer sheets of backing paper which allows the high compressive forces required for resin impregnation to be applied. As discussed above, the backing paper also allows the prepreg to be rolled up onto itself once produced without adjacent layers of prepreg adhering to each other.

However, it is known that passing prepreg with its backing paper through the slitting unit comprising slitting blades produces paper debris which produces an unacceptable result. It is therefore common practice to remove the backing paper before slitting.

Once the strips of prepreg are produced it is conventional to apply a backing sheet (which is wider than the strip of prepreg) and way-wind the strip onto a bobbin or spool. Such a bobbin is usually capable of holding several thousands of meters of such strip prepreg.

Such a bobbin or a plurality thereof, can be adapted for use with an automated lay-up apparatus, which automatically unravels the tape, removes the backing sheet and lays down the strips of prepreg. Typically a plurality of strips of prepreg are laid down parallel to each other.

Clearly it is desirable that any gaps or overlaps between adjacent strips are minimised. This is all the more important when a high quality result is essential, such as when constructing an aerospace component.

However it has been found that an intentional gap must be imposed if overlap of adjacent tapes is to be avoided. This is because variation in the width of the strips of prepreg has been observed in practice, and overlapping strips are more problematic than a gap between strips.

The present invention aims to mitigate or at least obviate the above described problems and/or to provide advantages generally.

SUMMARY OF THE INVENTION

According to the invention, there is provided a strip, a process and a use as defined in any one of the accompanying claims.

In this way, any intentional gaps between strips could be reduced without increasing the risk of overlaps between adjacent strips by providing strips of prepreg with a tighter tolerance on their width as they are laid down.

In a first aspect, the invention relates to a process for forming a plurality of strips of prepreg from a sheet of prepreg, wherein the sheet of prepreg comprises unidirectional fibres at least partially impregnated with curable thermosetting resin and comprising a flexible polymeric sheet on an outer face of the sheet of prepreg, the process comprising the step of slitting the prepreg into a plurality of strips, the slits being substantially parallel to the direction of alignment of the fibres.

In a second aspect, the invention relates to a strip of curable prepreg comprising unidirectional fibres aligned with the length of the strip, the fibres being at least partially impregnated with curable thermosetting resin and comprising a flexible polymeric sheet on an outer face of the strip, wherein the strip has a substantially rectangular cross-section defining a width and a thickness of the strip.

The inventors have found that strips of prepreg immediately following slitting have a very small variation in their width. It has therefore been surmised that any distortion of the width of conventional strips must be introduced in the process steps that follow slitting. The inventors have now found that if the prepreg sheet is provided with a polymeric sheet as its outer backing sheet, then this can remain in place during slitting without generating unacceptable debris as is found when paper is employed.

Additionally, and more importantly, it has been found that the variation in the width of the strips produced in this way is significantly reduced, providing a tighter tolerance and allowing a narrower gap to be required when automatically laying down a plurality of such strips. It is believed that the polymeric sheet assists in retaining the fibres in their initial position following slitting, reducing any spreading of the fibres in subsequent handling operations.

The strips produced are typically continuous in their length, and can have lengths of several thousands of meters. Due to processing limitations such lengths may involve a splice but this is considered to be a continuation of the same strip. Thus, the strips can have a length of at least 500 m, preferably at least 1,000 m, more preferably at least 2,000 m, most preferably of least 4,000 m.

The substantially rectangular cross-section of the strip is typically well-defined with a clear width and a clear thickness. In view of the fact that the polymeric sheet was present during slitting there is no initial difference in width between the polymeric sheet and the remainder of the strip. The width of the strips is typically in the range of from 2.0 to 50 mm, preferably from 3.0 to 25 mm. However depending on the applications the width may also range from 10 mm to 3500 mm, or from 50 mm to 3000 mm, or from 100 mm to 2000 mm, or from 150 mm to 2000 mm, or from 200 mm to 2000 mm. The thickness is typically in the range of from 0.05 to 1.0 mm, primarily depending on the quantity of fibres per strip as desired.

In one embodiment the sheet of prepreg comprises a second polymeric sheet on the other outer face of the prepreg during the slitting stage.

As discussed above, the strips of prepreg have a very tight tolerance in their width. Thus, the difference between the maximum width of the minimum width is typically less than 0.25 mm, or less than 0.20 mm, or even less than 0.125 mm along the length of the strip.

The polymeric sheet may take a variety of forms provided it is sufficiently flexible. However it is preferably a film, being non-porous and uniform across the sheet. Also, the polymeric sheet may be porous or perforated to improve the release of the sheet from the curable strip. The polymeric sheet may comprise holes or apertures.

The thickness of the polymeric sheet can be selected as desired according to the particular situation. However, thicknesses in the range of from 10 to 150 micrometers, preferably from 10 to 100 micrometers, is a suitable range.

The polymeric sheet may comprise a polyolefin, polyalphaolefin and/or combinations or copolymers thereof. The sheet may be made from a wide variety of materials, for example polyethylene, polyethylene terephthalate, polypropylene, and many other suitable polymers and/or combinations or copolymers thereof.

The unidirectional fibres may comprise cracked (i.e. stretch-broken), selectively discontinuous or continuous fibres, although continuous fibres are preferred. The term "unidirectional" is a term of art and means that the fibres are aligned with a common direction and each filament is free and not interwoven with the other filaments.

The unidirectional fibres may be made from a wide variety of materials such as carbon, graphite, glass, metallised polymers aramid and mixtures thereof.

The fibres are preferably substantially completely impregnated with resin, with all of the fibres being in contact with the curable resin.

The curable thermosetting resin may be selected from epoxy, isocyanate and acid anhydride, for example. Preferably the curable resin is an epoxy resin.

Suitable epoxy resins may comprise monofunctional, difunctional, trifunctional and/or tetrafunctional epoxy resins.

Suitable difunctional epoxy resins, by way of example, include those based on; diglycidyl ether of Bisphenol F, Bisphenol A (optionally bromianted), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

Difunctional epoxy resins may be preferably selected from diglycidyl ether of Bisphenol F, diglycidyl ether of Bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl others, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY721 from Huntsman Advanced Materials).

In view of the length of the strip according to the invention, the strip is typically wound onto a bobbin or spool. A particularly suitable winding involves the strip passing up and down the bobbin as it is wound, like thread on a spool with multiple windings being possible before the strip winds on top of previous windings of strip. Such a method of winding is called "way-wound".

Before being wound on the bobbin, the strip may be brought into contact with a second backing sheet. Typically this will only be required when there is only one polymeric sheet on one outer face of the prepreg. This involves the face not covered in the polymeric sheet coming into contact with the second backing sheet. Unlike the polymeric sheet, the second backing sheet is preferably wider than the resin and fibres in the strip. This helps to prevent any adhesion of adjacent strips on the bobbin.

In an alternative embodiment, a second backing sheet may be applied onto the polymeric sheet. Upon unwinding of the spool or bobbin, the second backing sheet may be located on the outer surface of the strip which is not covered by the polymeric sheet. This promotes release of the backing sheet without distortion of the fibres.

The backing sheet may be non-porous or may be porous to facilitate removal of the backing sheet from the strip upon or prior to its application in the lay up.

The process of manufacture of the strips according to the invention is typically a continuous process.

In a typical process one or more rotary blades are positioned as the sheet of prepreg is brought into contact with the blade or blades. Generally it is desirable to produce strips of prepreg of the same width from a single sheet of prepreg, thus preferably any blades are evenly spaced apart.

Before slitting, the sheet of prepreg can be manufactured in a conventional prepreg manufacturing process. As discussed above, it is conventional for a backing paper to be applied during prepreg manufacture. If this is the case then the paper must be removed before the prepreg passes to the slitting stage. In this embodiment, the polymeric sheet can be added before the sheet of prepreg passes to the slitting stage.

Alternatively, the sheet of prepreg can be manufactured with the polymeric sheet as the backing material instead of using paper. As the resin impregnation stage of prepreg manufacture can involve high temperatures, the polymeric sheet must be heat-tolerant in this embodiment.

However the sheet of prepreg is manufactured, it is generally the case that the polymeric sheet will have been pressed onto the resin and fibres under high pressure. This serves to form a stronger adhesive bond between the polymeric sheet and the resin and fibres and is believed to contribute to how the polymeric sheet acts to maintain the uniform width of the strip.

Thus, preferably the polymeric sheet has been applied under a compressive force before reaching the slitting stage, of at least 0.1 MPa, more preferably at least 0.2 MPa, most preferably at least 0.4 MPa.

As a result of the uniform width of the strip, it is therefore possible to automatically lay down a plurality of parallel strips with a reduced gap.

Thus, in a third aspect, the invention relates to a process of laying down a plurality of strips by means of an automated strip laying apparatus, the apparatus being arranged to lay the strips down parallel to each other and with a gap between the strips of less than 1.00 mm.

Preferably the gap is less than 0.80 mm, more preferably less than 0.60 mm, or even less than 0.40 mm. Adjacent strips may also be in contact with one another along at least part of their length.

The invention will now be illustrated, by way of example, and with reference to the following figures, in which.

EXAMPLES

Unidirectional carbon fibres were impregnated with an epoxy resin to form a prepreg (M21E/34%/UD268/IMA GS 12K) and was produced with process paper on one side. The paper on the prepreg was removed and a low density polyethylene (LDPE) sheet (LDPE-Folie from Huhtamaki) added to take its place. The polyethylene sheet was pressed onto the prepreg with a pressure of from 0.5 to 3 MPa.

Figure 1:
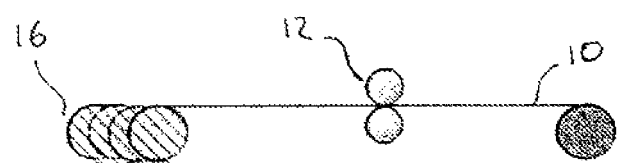
FIG. 1 is a schematic representation of a process according to the present invention.

Slitting of the prepreg was carried out according to the arrangement shown in FIG. 1. The prepreg 10 with backing sheet was then passed to a series of parallel slitters 12, which are precisely arranged to slit the prepreg into slit tapes of a specified width with a +/−0.125 mm tolerance along the length of the strips or tapes.

After slitting, the slit tapes are then passed over guide and support rollers to their respective spool winding positions 16. The slit tape is then way-wound onto a cardboard core holder traversing the length of the core holder to produce a spool of slit tape.

Samples of slit tape are then taken from the spool and their width measured by using a BenchMike 283 series benchtop laser micrometer. This is a non contact optical measurement involving a transmitter and receiver, wherein light is projected from the transmitter by a laser. The sample is placed between the transmitter and the receiver and the light signal that the receiver receives is used to calculate the dimensions of the sample.

Figure 2:
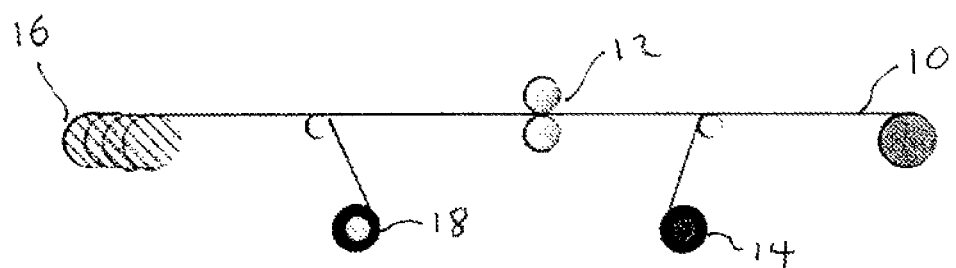
FIG. 2 is a schematic representation of a process not according to the present invention.

A comparative example was carried out according to the arrangement shown in FIG. 2. Prepreg 10 had its paper backing sheet removed before slitting by paper rewind 14. The prepreg then passed through slitters 12 with no backing material. In this case a polyethylene backing strip, wider than that of the slit tape produced is applied by polythene unwind 18 before winding onto the core holder 16.

Figure 3:
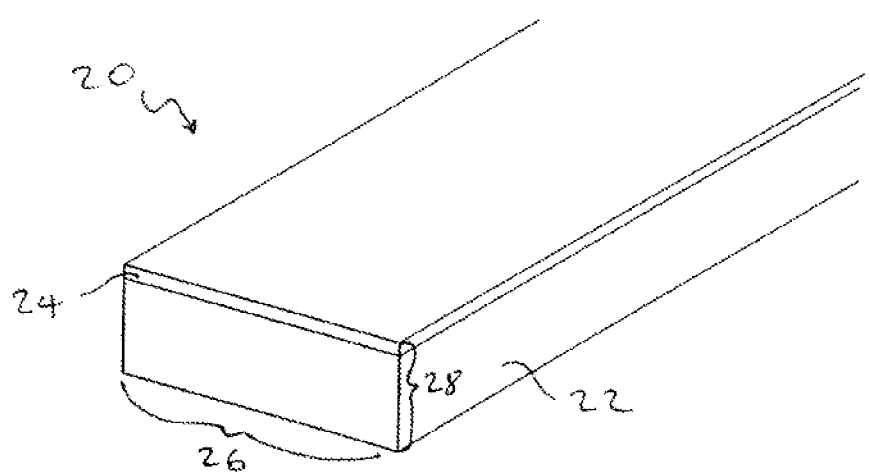
FIG. 3 is a perspective view of a portion of a strip of prepreg according to the present invention.

FIG. 3 shows a schematic representation of the slit prepreg 20 according to the invention produced by the arrangement shown in FIG. 1. The strip of prepreg 20 comprises resin-impregnated carbon fibres which are unidirectional and aligned with the long axis of the prepreg. The strip 20 also comprises a backing layer of polythene 24. It can be seen that the strip has a uniform width 26 and thickness 28, whilst the edge 22 has minimal deviations along the length of the strip.

Numerous measurements of slit tape widths from slit tapes according to the invention and the comparative examples were generated to see if there was a difference in the variation from the width established by the slitters.

Figure 4:
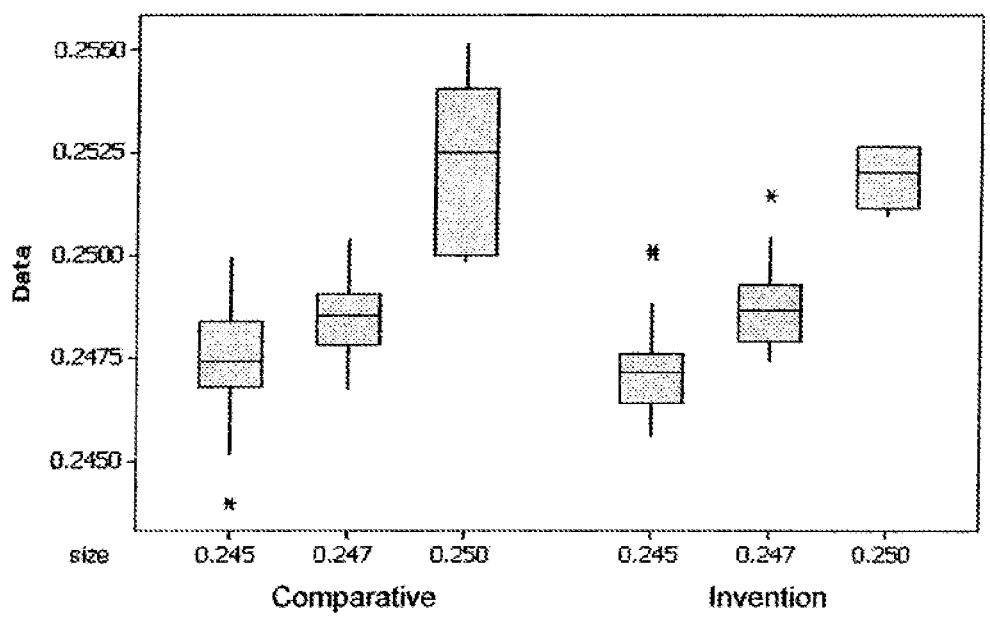
FIG. 4 is a chart showing the spread of slit tape width compared to the slit width generated at the slitting stage for embodiments according to the invention and comparative embodiments.

To facilitate tape lay up in automated tape laying equipment, slit widths at the slitters are generally set slightly narrower than the intended application width of the strip or tape. Following slitting, the width of the strip of tape generally extends slightly to the desired width. In the embodiment illustrated in FIG. 4, slit widths were set at 6.223 mm (0.245 inches), 6.274 mm (0.247 inches) and 6.35 mm (0.250 inches) for material having polyethylene backing sheet whilst being slit and material having no backing sheet while being slit. FIG. 4 shows the variation in the slit widths measured with the widths shown in inches.

The results are shown using conventional statistical conventions, with the mean being shown as a horizontal bar and all the data within 95% confidence limits being represented by the rectangle around the mean. Outliers are represented by a *.

It can be clearly seen that a tighter size distribution of widths can be achieved by the embodiments according to the invention when a slit width of 6.35 mm (0.25 inches) is set.

However, although it is not clearly shown by this chart, the widths are tighter for the 6.274 mm (0.247 inch) results as well. Further statistical analysis was carried out looking at how wide the distribution is and whether it corresponds to a normal distribution. For this analysis, Cp and Cpk data was assessed.

Cp and Cpk

The distribution of data is assumed to be normally distributed. Cp is "process capability" a measure of the spread of the data within the specification (defined as specification tolerance divided by six times the standard deviation). Cpk is "process capability corrected" a measure of the skew of the data from the mean to show how central the distribution is compared to the specification (defined as (upper specification limit minus the average) divided by three times the standard deviation).

Once the standard deviation of the data set is calculated it is used to then calculate the Cp and Cpk. If standard deviation is large then the deviation in data set is large and so process capability is poor shown by a low Cp value. Conventionally a Cp>1.33 is accepted as evidence that the process has good control.

If the Cpk value is less than the Cp value then the data is skewed to the left of the distribution and greater than Cp if the data is skewed to the right of the distribution. Thus when Cp=Cpk then there is no skew of data and distribution is centred on the nominal specification target value.

For the data according to the invention the Cp value was 1.12 and Cpk was 0.83. For the comparative examples the Cp was 0.74 and the Cpk was 0.52. An ideal value of Cp is 1.33, derived from the 4 sigma statistic.

The improved distribution in widths of the slit tape therefore allow a narrower gap width to be set when laying down such slit tapes without increasing the risk of overlap between neighbouring slit tapes.

Alternative embodiments of the invention can be defined as follows.

In embodiment 1, there is provided a strip of curable prepreg comprising unidirectional fibres aligned with the length of the strip, the fibres being at least partially impregnated with curable thermosetting resin and comprising a flexible polymeric sheet on an outer face of the strip, wherein the strip has a substantially rectangular cross-section defining a width and a thickness of the strip.

In embodiment 2, there is provided a strip according to embodiment 1, having a length of at least 500 m, preferably at least 1,000 m, more preferably at least 2,000 m, most preferably of least 4,000 m.

In embodiment 3, there is provided a strip according to embodiment 1 or 2, having a width of from 2.0 to 50 mm, preferably from 3.0 to 25 mm.

In embodiment 4, there is provided a strip according to embodiment 1 to 3, having a thickness in the range of from 0.05 to 1.0 mm.

In embodiment 5, there is provided a strip according to embodiment 1 to 4, comprising a second polymeric sheet on the other outer face of the prepreg.

In embodiment 6, there is provided a strip according to embodiment 1 to 5, wherein the difference between the maximum width of the minimum width is less than 0.25 mm.

In embodiment 7, there is provided a strip according to embodiment 1 to 6, wherein the polymeric sheet is a film.

In embodiment 8, there is provided a strip of curable prepreg according to embodiments 1 to 7, wherein the thickness of the polymeric sheet is in the range of from 10 to 150 micrometers, preferably from 10 to 100 micrometers.

In embodiment 9 there is provided a strip of curable prepreg according to any one of embodiments 1 to 8, wherein this polymeric sheet is made from polyethylene, polyethylene terephthalate, polypropylene, or mixtures thereof.

In embodiment 10, there is provided a strip of curable prepreg according to any one of embodiments 1 to 9 which is way-wound onto a bobbin.

In embodiment 11, there is provided a process for forming a plurality of strips of prepreg according to any one of embodiments 1 to 10 from a sheet of prepreg, wherein the sheet of prepreg comprises unidirectional fibres at least partially impregnated with curable thermosetting resin and comprising a flexible polymeric sheet on an outer face of the sheet of prepreg, the process comprising the step of slitting the prepreg into a plurality of strips, the slits being substantially parallel to the direction of alignment of the fibres.

In embodiment 12, there is provided a process according to embodiment 11 which is a continuous process.

In embodiment 13, there is provided a process according to embodiment 11 or 12, wherein one or more rotary blades are positioned as the sheet of prepreg is brought into contact with the blade or blades.

In embodiment 14, there is provided a process according to any one of embodiments 11 to 13, wherein any blades are evenly spaced apart.

In embodiment 15, there is provided a process according to any one of embodiments 11 to 14, wherein the polymeric sheet has been applied under a compressive force before reaching the slitting stage, of at least 0.1 MPa, more preferably at least 0.2 MPa, most preferably at least 0.4 MPa.

In embodiment 16, there is provided a process of laying down a plurality of strips according to any one of embodiments 1 to 10 or obtainable by a process according to any one of embodiments 11 to 15, by means of an automated strip laying apparatus, the apparatus being arranged to lay the strips down parallel to each other and with a gap between the strips of less than 1.00 mm.

In embodiment 17, there is provided a process according to embodiment 16, wherein the gap is less than 0.80 mm, preferably less than 0.60 mm, more preferably less than 0.40 m.

In embodiment 18, there is provided a process according to embodiments 16 or 17, wherein the strips are laid down to construct an aerospace vehicle body component.

What is claimed is:

1. A method for making a slit tape for use in an automated tape laying machine, said method comprising:
   providing a sheet of prepreg which comprises unidirectional fibers that are oriented in a direction of alignment, said unidirectional fibers being at least partially impregnated with curable thermosetting resin, said sheet of prepreg further comprising a flexible polymeric sheet which forms an outer face of said sheet of prepreg;
   slitting said sheet of prepreg in a direction that is substantially parallel to said direction of alignment of said unidirectional fibers by passing said sheet of prepreg to parallel slitters which are arranged to slit the sheet of prepreg into a plurality of slit tapes having a width of from 0.25 inch to 2 inches with a +/−0.005 inch tolerance along the length of said slit tapes; and
   winding said slit tape to form a spool of slit tape wherein the difference between the maximum width and minimum width of slit tape that is unwound from said spool is less than 0.005 inch.

2. The method for making slit tape for use in an automated tape laying machine according to claim 1, wherein the flexible polymeric sheet is a polyalphaolefin film or a polyalphaolefin copolymer film.

3. The method for making slit tape for use in an automated tape laying machine according to claim 1, wherein the flexible polymeric sheet is porous.

4. The method for making slit tape for use in an automated tape laying machine according to claim 1 wherein said strip of curable prepreg has a thickness in the range of from 0.05 mm to 1.0 mm.

5. The method for making slit tape for use in an automated tape laying machine according to claim 1 wherein said flexible polymeric sheet has a thickness in the range of from 10 micrometers to 100 micrometers.

6. The method for making slit tape for use in an automated tape laying machine according to claim 1 wherein said curable thermosetting resin is an epoxy resin.

7. The method for making slit tape for use in an automated tape laying machine according to claim 1 wherein said unidirectional fibres comprise unidirectional carbon fibres.

8. The method of making slit tape for use in an automated tape laying machine according to claim 1, which includes the additional step of unwinding said spool of slit tape to form an unwound slit tape wherein the difference between the maximum width and minimum width of said unwound slit tape is less than 0.005 inch.

* * * * *